United States Patent [19]

Suzuki

[11] Patent Number: 4,742,351
[45] Date of Patent: May 3, 1988

[54] IC CARD SYSTEM

[75] Inventor: Hideo Suzuki, Tokyo, Japan

[73] Assignee: Casio Computer Co., Ltd., Tokyo, Japan

[21] Appl. No.: 880,809

[22] Filed: Jul. 1, 1986

[30] Foreign Application Priority Data

Jul. 12, 1985 [JP] Japan .................................. 60-153637

[51] Int. Cl.⁴ ............................................. H04Q 1/00
[52] U.S. Cl. ............................... 340/825.34; 235/380; 340/825.31
[58] Field of Search ........................ 340/825.3–825.34; 364/705, 706; 235/380, 382, 382.5, 379, 441, 492

[56] References Cited

U.S. PATENT DOCUMENTS

| 3,764,742 | 10/1973 | Abbott et al. | 340/825.3 X |
| 4,271,482 | 6/1981 | Giraud | 340/825.34 X |
| 4,394,654 | 7/1983 | Hofmann-Cerfontaine | 235/380 X |
| 4,523,087 | 6/1985 | Benton | 340/825.33 X |
| 4,544,833 | 10/1985 | Ugon | 235/380 X |
| 4,582,985 | 4/1986 | Lofberg | 340/825.34 X |
| 4,614,861 | 9/1986 | Pavlov et al. | 235/380 |

FOREIGN PATENT DOCUMENTS

| 55461 | 3/1985 | Japan | 364/705 |
| 55462 | 3/1985 | Japan | 364/705 |
| 220482 | 11/1985 | Japan | 364/705 |
| 2157463 | 10/1985 | United Kingdom | 364/705 |

*Primary Examiner*—Ulysses Weldon
*Attorney, Agent, or Firm*—Frishauf, Holtz, Goodman & Woodward

[57] ABSTRACT

An IC card is inserted in an IC card terminal. Under this condition, the PAN data read out from the IC card is compared with the decrypted PAN data for identification purposes. Then, the IC card is removed from the terminal. The PIN data input to the IC card is compared with the PIN data prestored in the IC card. The results of the comparison are used to identify the validity of the IC card, the terminal, and the card owner.

18 Claims, 7 Drawing Sheets

IC CARD SYSTEM

BACKGROUND OF THE INVENTION

The invention relates to an IC (integrated circuit) card system of the type in which IC cards are identified when they are connected to an external device such as a terminal. Throughout this specification and claims, the abbreviated term "IC" is used to denote integrated circuit.

IC cards containing IC circuits, in which personal identification numbers are prestored, have been used widely. When a business transaction is made using this IC card, the card is inserted in IC card terminal devices, such as those installed in banks or stores. The user keys in his personal identification number (PIN) using the keyboard of the terminal device. The terminal device compares the PIN read out from the IC card with the keyed in PIN. If these are coincident, the device determines that the terminal device in use is proper, and the IC card and its holder are both rightful and valid. Then, the business transaction is allowed.

However, the above IC card system in which the IC card is set to the terminal device to identify the PIN, suffers from some disadvantages. First of all, when the PIN is keyed in at the store, for example, there is a possibility that it will be memorized by someone watching the key-in operation. Secondary, there are terminal devices of a type in which the PIN keyed in by a card owner is stored upon receipt of a signal representing the coincidence between the keyed in PIN and the corresponding prestored one. In such a device, there is the danger that the PIN of the real card owner may be stolen by the owner of a shop, for example, equipped with this type of terminal device.

The first problem can easily be solved if the card owner carefully keys in his PIN so as not to have it stolen. As for the second problem, there is no countermeasure that can be taken by the card owner.

To cope with this problem, an improved IC card system is therefore proposed. At the time of issuing IC cards, the PIN of a card owner is stored in the card. The PIN keyed in from a keyboard on the card itself is compared with the corresponding stored one for PIN identification. The result of the identification is quickly displayed by a display window on the card. Thus, in this IC card system, the card holder can be identified using only the card, without any connection to the terminal device. This approach still involves the problem that the IC card itself could be duplicated. In this card system, if the display window shows "Real owner, OK", it is impossible to check if the card was issued by a valid card company, and it is very difficult to conclusively identify the real card owner. In this respect, there is no way, except by connecting the IC card to the external device, to identify the validity of the card.

SUMMARY OF THE INVENTION

Accordingly, an object of this invention is to provide an IC card system which can identify the validity of an external device, a card per se and its owner, and can prevent the card identification number from being stolen.

In the IC card system according to this invention, an IC card identifies the validity of the external device and the card per se, by connection to the external device. The card contains a memory for storing PIN data of a predetermined number of characters. The card is further provided with input means for entering the predetermined number of character data, when it is disconnected from the external device. In the IC card, comparison is made between the predetermined number of character data, as entered by the input means, with the prestored PIN for PIN identification. The identification results are output from the card.

DETAILED DESCRIPTION OF THE PREFERRED EMBODIMENT

Figure 1:
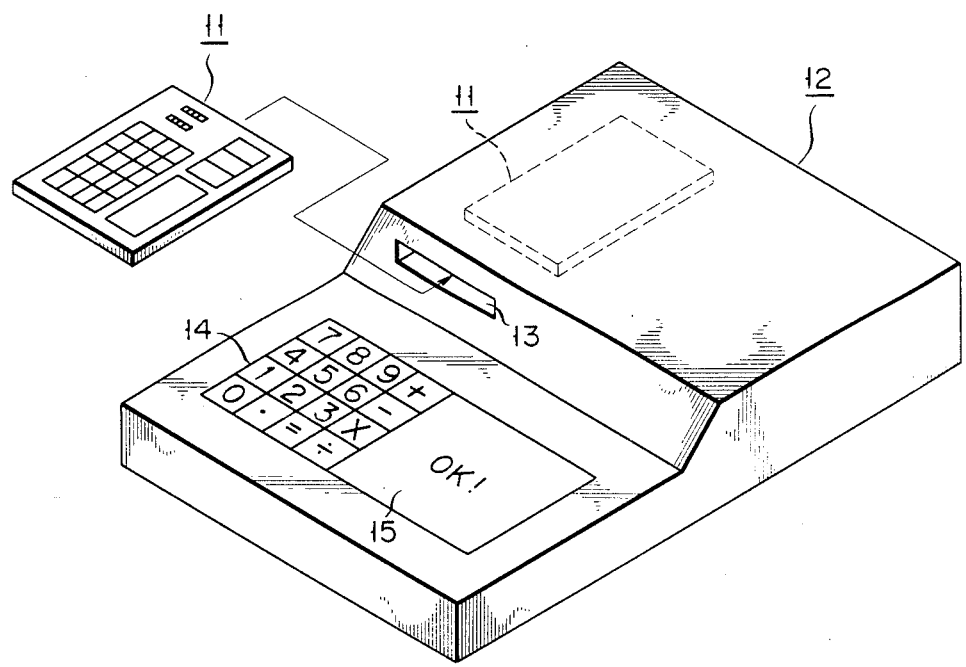
FIG. 1 shows a perspective view illustrating the entire IC card system according to an embodiment of this invention.

The preferred embodiment of this invention will be described in detail, with reference to the accompanying drawings. In FIG. 1, for the business transaction, IC card 11 is inserted in card insertion slot 13 of terminal 12, as installed in a shop, for example, and is located as shown by the dotted lines. Terminal 12 is provided on its top surface with keyboard 14, including ten numeric keys and function keys for arithmetic calculation, and also LCD-element display section 15.

Figure 2:
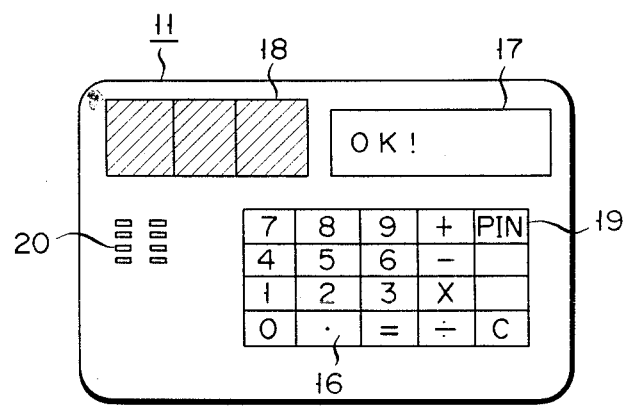
FIG. 2 shows a plan view of the IC card used in the FIG. 1 system.

IC card 11, as shown in FIG. 2, is provided on one side with keyboard 16, LCD display section 17, and solar battery 18. Keyboard 16 contains PIN key 19 and clear key C, in addition to arithmetic calculation keys, such as ten keys and function keys. PIN key 19 permits entry of a personal identification number (PIN) when the validity of the IC card and the card owner is identified. PIN is a code consisting of a predetermined number of characters, set by the card owner. Provided on IC card 11 is connection terminal 20 including, for example, eight contacts. When card 11 is inserted in terminal 12, as shown in FIG. 1, connection terminal 20 makes contact with the corresponding connection terminal (to be described later) inside terminal 12, to permit transfer of data between card 11 and terminal 12, and the supply of power from terminal to card.

A circuit arrangement of IC card 11 will be described, with reference to FIG. 3.

Figure 3:
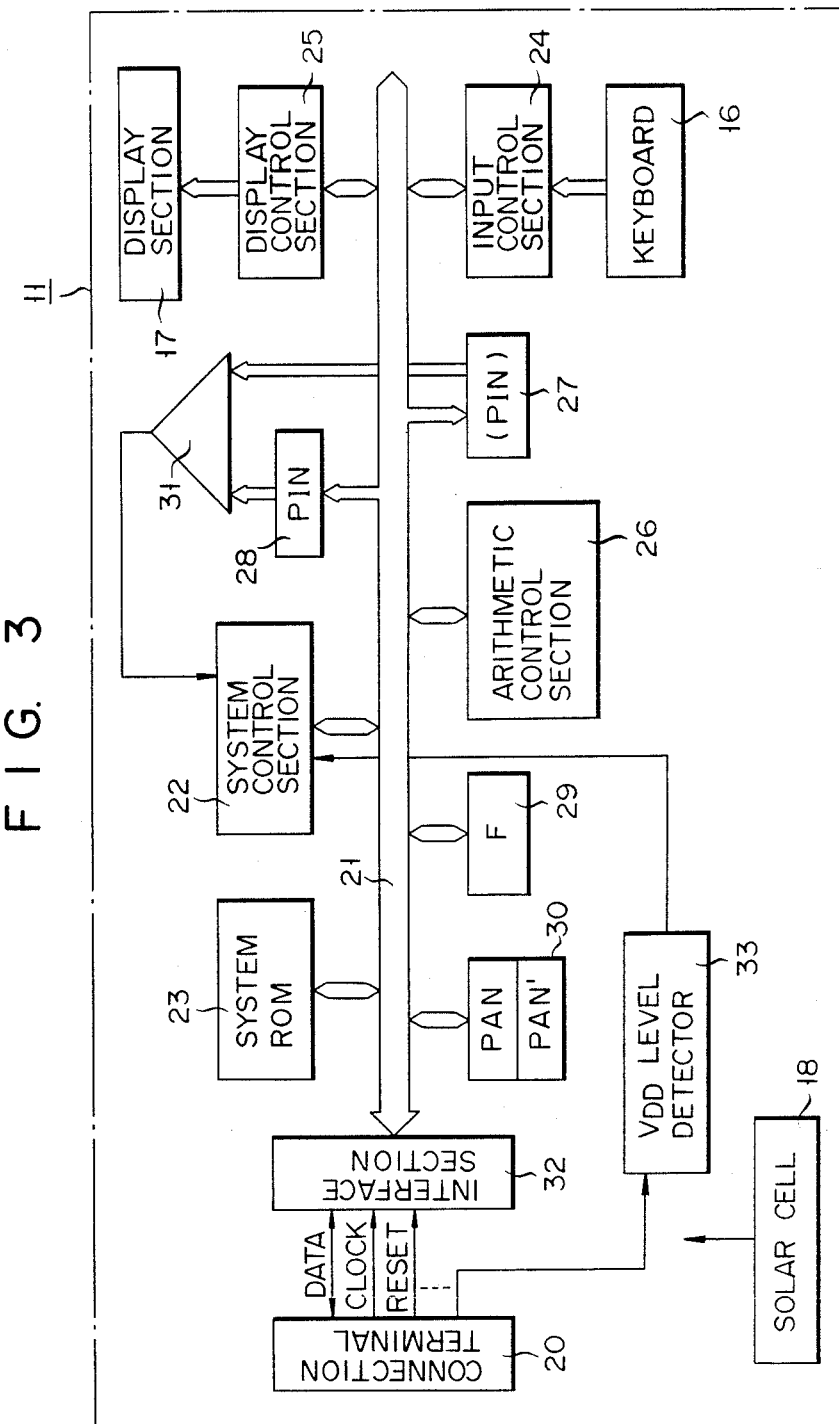
FIG. 3 is a block diagram of the circuit contained in the IC card shown in FIG. 2.

In this diagram, bus line 21 is coupled with system control section 22, whose main part is the CPU for the control of the overall system of FIG. 3, system ROM 23, input control section 24 for controlling the operation of keyboard 16, display control section 25 for the control of display section 17, and arithmetic control section 26. Bus line 21 is further connected to PIN memory 27, PIN latch section 28, flag register 29, and PAN memory 30. Stored in memory 27 is PIN data as set by the card owner himself at the time of card 11 being issued. PIN latch section 28 latches therein the data consisting of a predetermined number of characters which is entered by means of PIN key 19 on keyboard 16. Latch section 28 and memory 27 are coupled with PIN data comparator 31. The output of comparator 31 is supplied to system control section 22. System control section 22 controls flag register 29 to raise flag "1" or "0" according to the coincidence or noncoincidence of the comparison result output from comparator 31. PAN memory 30 stores the primary account number (PAN) as preset by a card issuer and coded PAN' as the PAN coded according to a specific algorithm. The coded PAN' is decrypted by PUK (public key code), to be described later. PIN memory 27 and PAN memory 30 may be constructed with EPROM (erasable-programmable ROM). PIN latch section 28 and flag register 29 may be constructed with RAM. Bus line 21 is connected to terminal 20 via interface section 32. The card circuit made up of system control section 22 to interface section 32, when it is solely used, is driven by power voltage $V_{DD}$ from solar battery 18. When used with connection to terminal 12, it is driven by power voltage $V_{DD}$ supplied from terminal 12 through connection terminal 20. This power voltage is detected by level detector 33, and its output is sent to system control section 22. The IC card circuit is designed such that, in the power supply mode with connection to terminal 12, the key-in operation of character data by PIN key 19 on keyboard 16 is inhibited by system control section 22 when it receives the output signal from detector 33.

Figure 4:
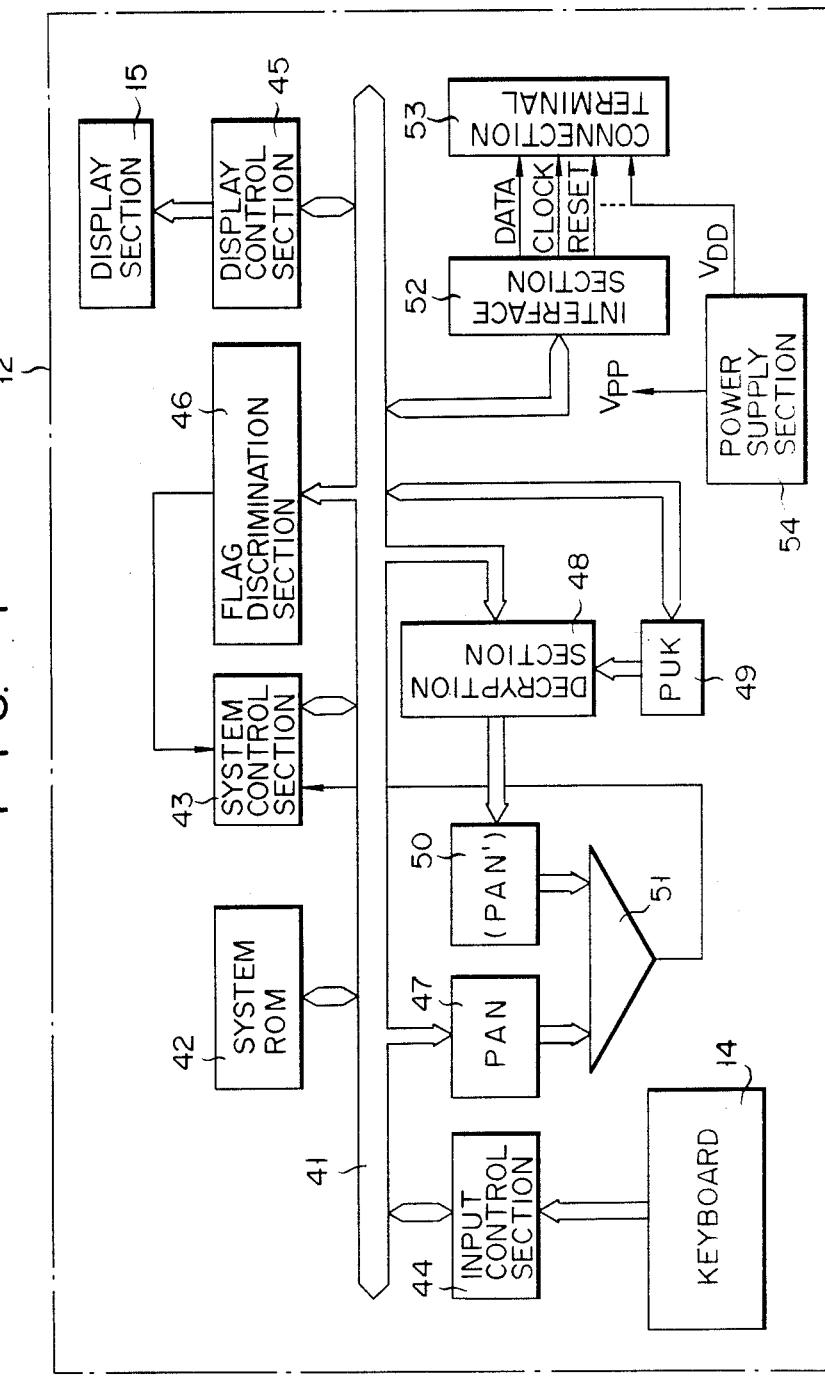
FIG. 4 is a block diagram of the circuit of the terminal device shown in FIG. 1.

A circuit arrangement of IC card terminal 12 will be described with reference to FIG. 4.

In this figure, bus line 41 is connected to system ROM 42, system control section 43, input control section 44 for controlling keyboard 14, display control section 45 for controlling display section 15, and flag discrimination section 46 to check if flag "1" is raised in flag register 29 in FIG. 3. The flag discrimination signal from section 46 is transferred to system control section 43. Bus line 41 is connected to PAN latch section 47 for latching PAN data from IC card 11 connected to terminal 12, and decryptment section 48 for decrypting the coded PAN'. PUK memory 49 for storing the key code for decryption is connected to decryption section 48. The PAN as decrypted by the key code in the memory is latched in decryptment PAN latch section 50. These latch sections 50 and 47 are connected to account number comparator section 51. The output signal from comparator section 51 is supplied to system control section 43. Bus line 41 is connected to connection terminal 53 via interface section 52. Terminal 53 is provided inside card insertion slot 13 shown in FIG. 1, and connected to the power supply line of power voltage $V_{DD}$ connecting to power supply section 54. The terminal circuit made up of system ROM 42 to interface section 52 is driven by power voltage Vpp from section 54.

The operation of the above-mentioned embodiment to successively identify the validity of terminal device 12 and IC card 11, and the real owner of the card, will be described with reference to flowcharts shown in FIGS. 5 and 6.

Figure 5:
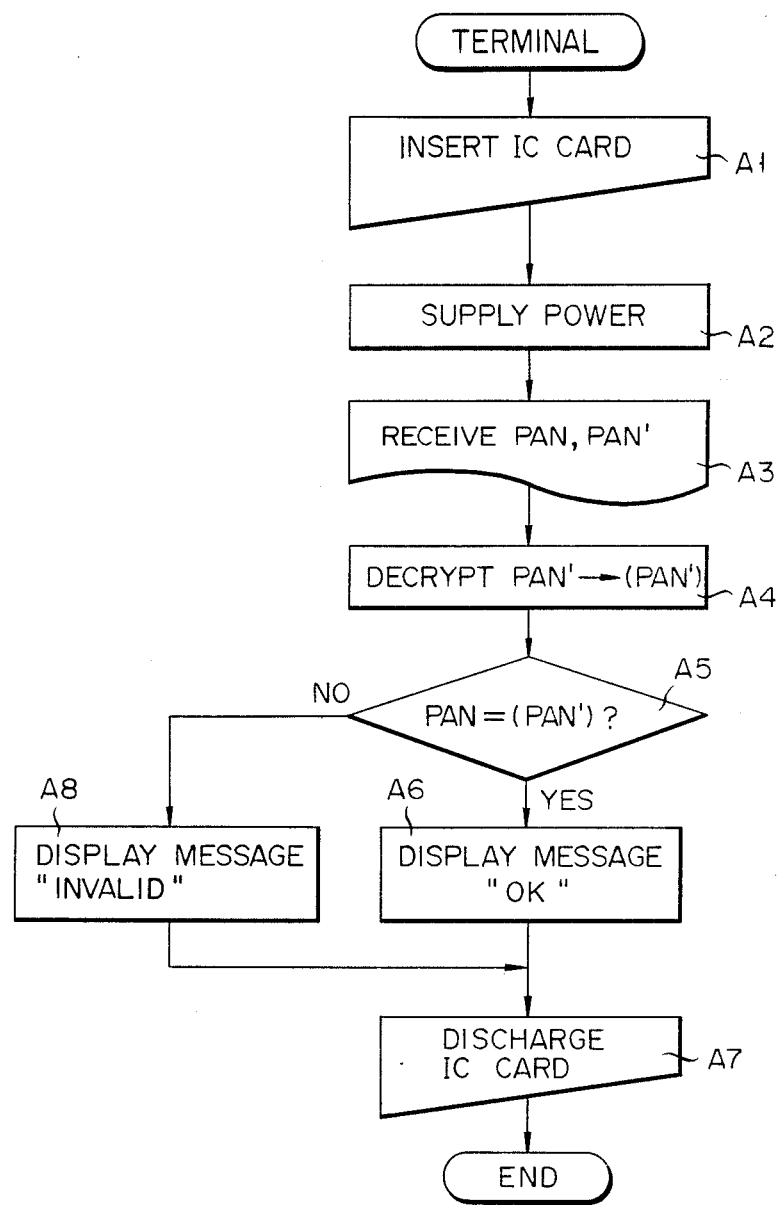
FIGS. 5 to 8 show flowcharts for explaining the operation of the embodiment.
Figure 6:
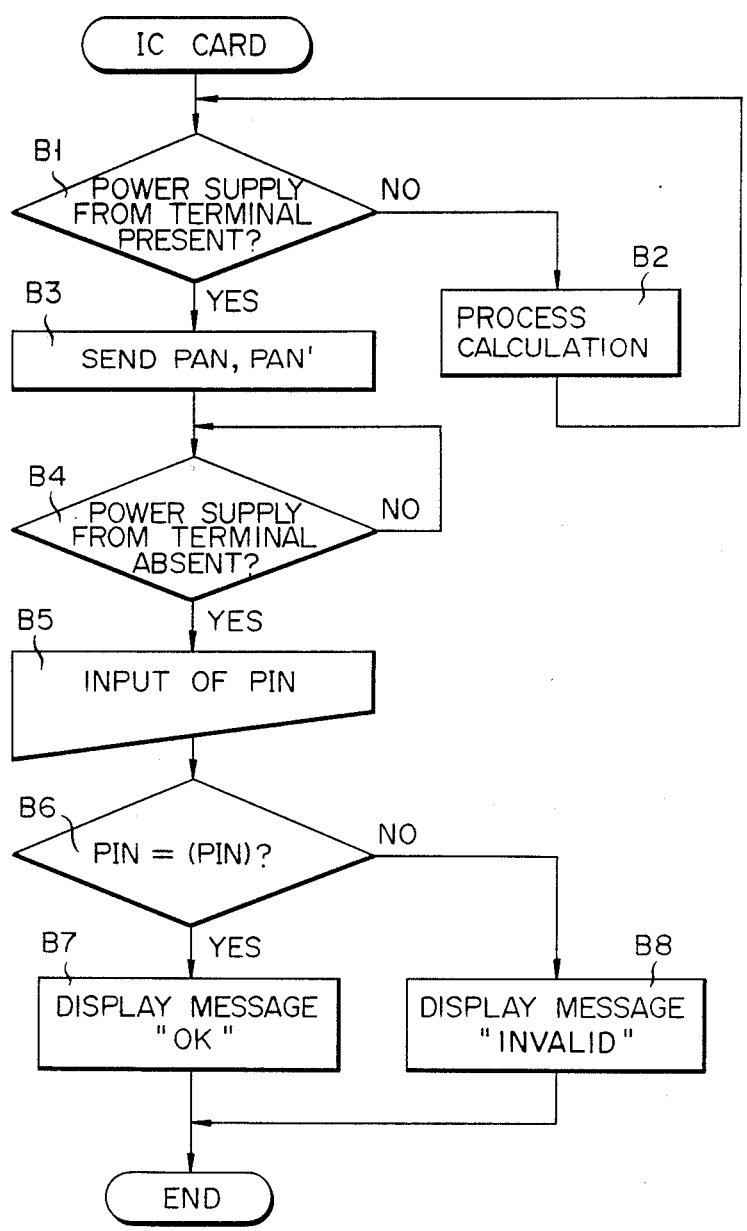

FIG. 5 shows the operational flowchart of IC card terminal 12, and FIG. 6 shows the operational flowchart of IC card 11. First of all, IC card 11 is operated independently, by using solar cell 18, as shown in step B1 of FIG. 6. The presence or absence of power voltage $V_{DD}$ supply from the terminal 12 side is determined from the output of detector 33. In this step B1, if the answer is N (NO), in other words, if it is determined that the connection is not made, control goes to step B2, and the data keyed in from keyboard 16 is handled in the normal small electronic calculator fashion.

In step A1 of FIG. 5, when IC card 11 is inserted in the card insertion slot 13 of terminal 12, and the connection terminal 20, of the card 11 side, and connection terminal 53, of the terminal 12 side, are electrically connected, control goes to step A2, and the supply of voltage $V_{DD}$ from power supply section 54 to the card 11 side begins. Then, in step B1 of the card 11 side, and if the answer is Y (YES), in other words, if it is determined that a perfect connection is made between power supply voltage $V_{DD}$ and terminal 12, control goes to step B3. Primary account number PAN or encrypted account number PAN', which is taken out from PAN memory 30, is transmitted to the terminal 12 side via interface section 32. Then, in step A3, terminal 12 receives the PAN or PAN' data sent from the card 11 side. The PAN, data is sent to PAN latch section 47, and the PAN' data is sent to decryption section 48. In step A4, decryptment section 48 decrypts the coded account number PAN' data in accordance with the code decryptment key code data stored in PUK memory 49, and latches it in PAN latch section 50 as PAN' data. After this, control goes to step A5, account number comparator section 51 comparatively identifies the account number PAN data latched in PAN latch section 47 and decryptment PAN latch section 50. If the answer to step A5 is YES, in other words, if the PAN data sent from the card 11 side and the PAN' data decrypted by terminal 12 are the same, it is determined that the presently connected IC card 11 and terminal 12 are valid, and control goes to step A6. Display control section 43 causes display section 15 to display a card OK message, "OK". From this, it can be confirmed that this IC card 11 is a valid card that was properly issued by a bank, for example. Also it can be understood that terminal 12 is a valid terminal.

Then, control goes to step A7, and card 11 is removed from terminal 12. Connection terminal 20 and connection terminal 53 are disconnected. Power supply voltage $V_{DD}$ from power supply section 54 to IC card 11 is stopped, and a YES answer is obtained from the output of detector 33 in step B4. Next, control goes to step B5, and personal identification number (PIN) data is keyed in using PIN key 19 of keyboard 16. This PIN data that is keyed in is sent to and latched into PIN latch section 28. The keyed-in PIN data latched into PIN latch section 28 and the PIN data of the card owner already entered in PIN memory 27 are comparatively identified by personal information comparator 31 in step B6. If the answer here is YES, in other words, if the above two PIN numbers are the same, the person who keyed in the PIN in step B6 is considered to be the real owner, and control goes to step B7. Then, system control section 22 causes display section 17 to display an "OK" message, the present holder of this card 11 is identified to be the real owner, thus the validity of the card 11, terminal 12, and the owner of the card 11 are all confirmed together.

On the other hand, if the answer is NO, in other words, if the PAN data generated by the card 11 presently connected to the terminal 12 and the PAN' data decrypted by terminal 12 are not the same, the presently connected card 11 is determined not to be a properly issued card, control goes to step A8, and system control section 43 causes display section 15 to display an unusable card "INVALID" message. Because of this, it is considered that there is a strong possibility this card 11 is, for example, a forgery, and at this point in step A8, it is determined that the holder of card 11 is not the real owner.

Further, in step A6, even if an "OK" message is displayed but a NO answer is obtained in step B6, in other words, if the PIN data keyed in by card 11 and the PIN data already stored in the memory are not the same, control goes to step B8, and system control section 22 causes display section 17 to display an "INVALID" message. With this display, it can be confirmed that the card holder himself is not the real card owner, even if this card 11 corresponds properly to terminal 12. In this case, it can be determined that card 11 might be stolen.

Figure 7:
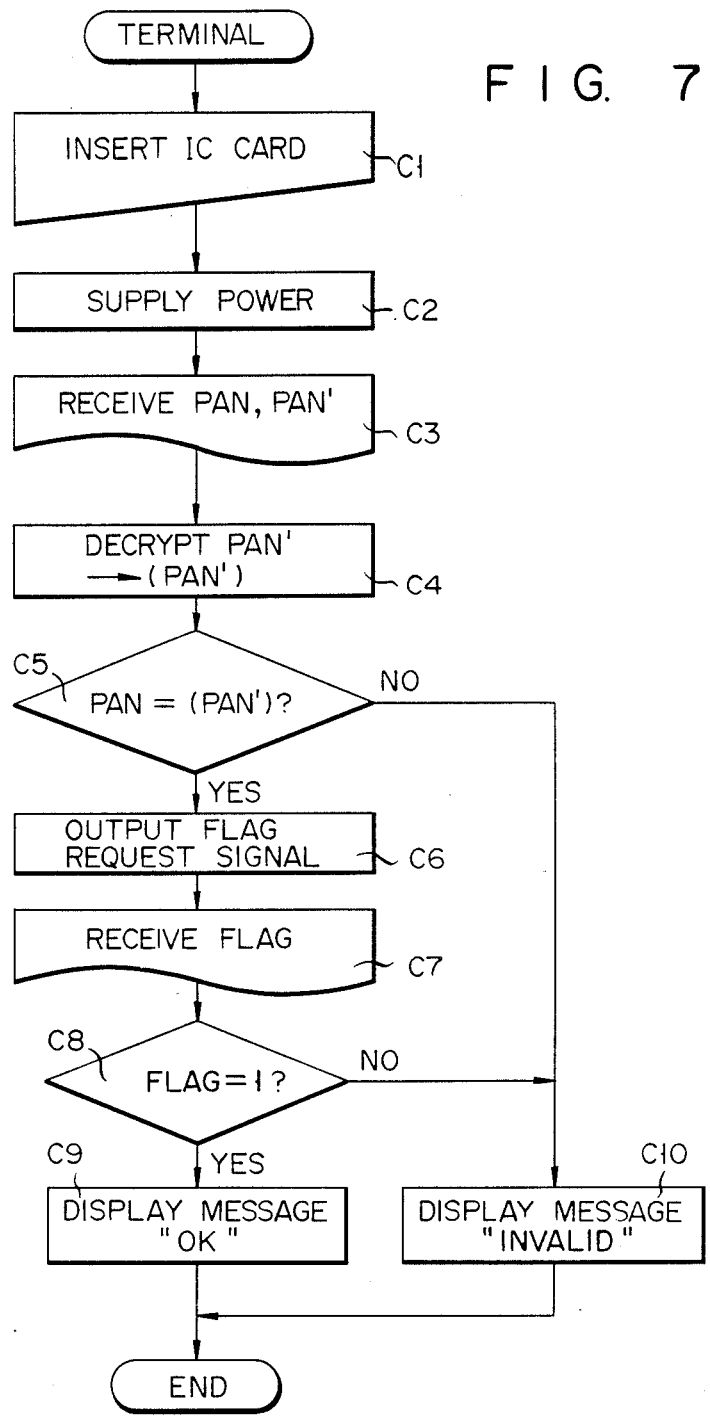
Figure 8:
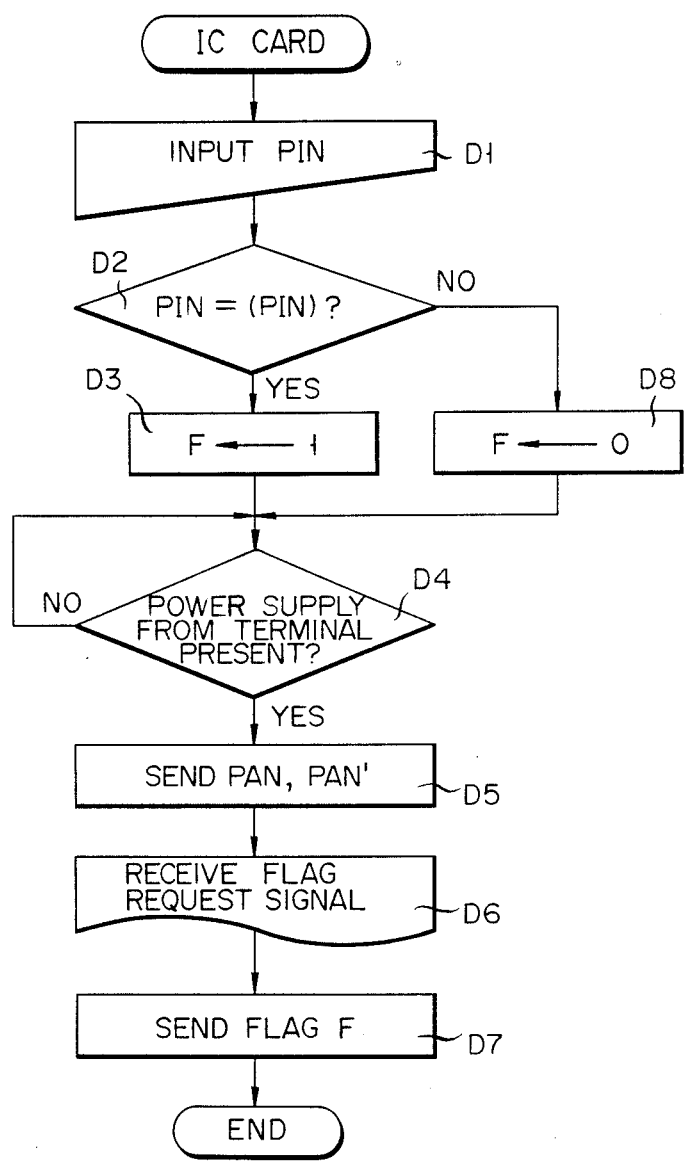

In the above-mentioned identification system, in step A6, the message "OK" of card is displayed and in step B7 of FIG. 6, the message "OK" of the holder is displayed. With these two steps of display, the validity of card 11 and the card owner can be confirmed. In the description to follow, the message relating to the validity of the card owner is not displayed, but only the message "OK" or "INVALID" is displayed. This operation will be described using the flowcharts in FIGS. 7 and 8.

In step D1, PIN data is entered by PIN key 19 on the keyboard 16 of IC card 11. At this time, card 11 is not in terminal 12, as indicated by the solid line in FIG. 1. Then, the entered PIN data is sent to and latched in PIN latch section 28. In step D2, comparator 31 compares the entered and latched PIN data and the PIN data of the real owner, prestored in PIN memory 27, for the PIN identification. If the answer is YES in this step, control goes to step D3, because this answer indicates that both PIN data coincide with each other, and the key operator in step D1 is the real owner of card 11. In step D3, system control section 22 causes flag register 29 to raise flag "1". Here, the result of identification in step D2 is not displayed, so that one cannot know if the input PIN is proper or not, that is, a person who stole or picked up the card 11 cannot tell if the PIN is proper or not. Subsequently, step D4 is executed. In this step, the card 11 always checks if power voltage $V_{DD}$ is supplied from terminal 12, by using detector 33. In step C1, card 11 is inserted at the leading end into card insertion slot 13 of terminal 12, to electrically couple connection terminal 20 of the card 11 with connection terminal 53 of the terminal 12. Then, control goes to step C2. In this step, the power supply of voltage $V_{DD}$ starts from power supply section 54 of terminal 12 to card 11. In step D4, the answer YES is given on the basis of the output from detector 33. This answer indicates that power voltage $V_{DD}$ is being supplied to card 11, and a complete electrical connection between them is set up. Following this step, step D5 is executed. In this step, the PAN data taken out of memory 30 and encrypted PAN' data are sent through interface section 32 to terminal 12. Upon receipt of this, terminal 12, in step C3, latches PAN data in PAN latch section 47, and sends PAN' data to decryptment section 48. In section 48, in step C4, a key code for decryptment is read out of PUK memory 49. Then, section 48 decrypts PAN' data using this key code. The decrypted PAN data is latched in PAN latch section 50. Next, step C5 is executed. Step C5 compares, by using comparator 51, the PAN data in latch section 47 with PAN' data latched in latch section 50. In step C5, the answer is YES. In other words, the PAN data coming from the card 11 is coincident with the PAN' data, to thereby indicate that terminal 12 and the IC card 11 are both proper. If necessary, this result may be displayed. Step C6 is then executed, and system control section 43 sends a flag request signal to IC card 11. Card 11 receives the flag request signal from terminal 12 in step D6. Control then goes to step D7 where the flag "1" data set in flag register 29 in step D3 is transferred to terminal 12. In turn, terminal 12 receives the flag signal from card 11 in step C7. Step C8 checks if flag "1" data is raised, using the flag signal. The answer in step C8 is YES. That is to say, the now connected IC card 11 is proper. Further, in step D2, the key operator of PIN in step D1 is identified as the real owner. After this step, step C9 is performed to operate system control section 43 to display the card OK message "OK", by display section 15. In this way, it is confirmed that the terminal 12 is proper, card 11 per se was properly issued, and the card holder is the real owner. The validity of the card owner is thereby ensured.

In step D2, the answer N (NO) is given, and control goes to step D8. The answer NO indicates that PIN data keyed in by IC card 11 is not coincident with the true PIN data as prestored. In step D8, system control section 22 commands flag register 29 to set flag "0" in flag register 29. In this case, even if Y (YES) is given in step C5, the answer in step C8 is NO, and control advances to step C10. The answer YES in step C5 indicates that the PAN data sent from IC card 11 is coincident with the PAN' data decrypted by terminal 12, and the IC card 11 now connected to terminal 12 is rightful. In step C10, display section 15 displays the "INVALID" message under control of system control section 43. With this step, even if IC card 11 correctly corresponds to terminal 12, it is determined that the card owner himself is not the real owner. Further, since the result of step D2 is not displayed, if another person inputs the PIN, he cannot know this is correct or not. In this case, there is a strong possibility that this card 11 was stolen.

In step D5, if the answer is NO, control proceeds to step C10, because this answer indicates that PAN data sent from the card 11 coupled with terminal 12 is not coincident with PAN' data decrypted by terminal 12, and it is therefore determined that the card 11 now connected to terminal 12 was issued inappropriately. In step C10, system control section 43 causes display section 15 to display the "INVALID" message. This message implies that the card 11 might be forged. Further, in this step, it is determined that the card holder is not the real owner.

With such an arrangement, according to the personal identification system used in the IC card, it can be determined not only if the card holder is the real owner, but also if the card was properly issued by a bank, for example, and if the terminal per se is proper. Therefore, this identification system can reliably prove the validity of the card user. It should be noted that the PINs comparison operation in card 11 is inhibited when it is connected to terminal 12. This feature completely prevents the PIN of the card user from being stolen, even if some malicious modification is applied to the terminal.

As can be seen from the foregoing, this invention has successfully provided an IC card system capable of identifying the validity of an external device and the card per se, by connection to the external device. The card contains a memory for storing PIN data of a predetermined number of characters. The card is further provided with means for entering the predetermined number of character data, when disconnected from the external device. In the IC card, comparison is made between the predetermined number of character data, entered by the input means, with the prestored PIN, for the PIN identification. The identification results are output from the card. Therefore, the PIN of the card owner is never stolen. The validity of the terminal and the IC card, and the card owner can reliably be confirmed.

What is claimed is:

1. In an IC card system for identifying the validity of an IC card device having at least one integrated circuit (IC) chip, when the IC card device is connected to an external device, the improvement wherein said IC card device comprises:

first memory means contained in said IC card device for storing first identification data of a predetermined number of characters;

input means for inputting second identification data of a predetermined number of characters;

first comparing means for comparing said second identification data, as inputted by said input means, with said first identification data prestored in said first memory means in said IC card device;

output means for outputting the results of the comparison by said first comparing means;

connection terminal means for electrical connection to said external device;

detecting means for detecting the connection state of said IC card device with said external device;

second memory means for storing third identification data for identifying said external device and said IC card device;

transferring means for automatically transferring said third identification data stored in said second memory means to said external device via said connection terminal means; and control means for controlling said transferring means in accordance with the detection state of said detecting means.

2. The system of claim 1, wherein said detecting means includes level detector means coupled to said connection terminal means for detecting a power supply from said external device.

3. The system of claim 2, wherein:

said second memory means includes a first area for storing a personal account number data (PAN data) and a second area for storing encyrpted data of the PAN data;

said external device includes decrypting means for decrypting the encrypted PAN data sent from said second area of said second memory means responsive to a predetermined key code in said external device; and said external device further includes second comparing means for comparing the decrypted PAN data decrypted in said decrypting means with the PAN data transferred from said IC card device;

whereby the validity of said IC card is identified.

4. The system of claim 1, wherein said output means comprises a liquid crystal display.

5. The system of claim 4, wherein:

said input means includes numeric keys and function keys for arithmetic operation; and said IC card device includes means for performing predetermined calculations according to input data of said numeric keys and function keys.

6. The system of claim 3, wherein said control means includes means for allowing said second identification data to be inputted into said IC card device when said second comparing means outputs a coincidence signal and said detecting means detects that said IC card device is not connected with said external device.

7. The system of claim 3, wherein said external device includes an insertion section for receiving an IC card device; and a display section for displaying at least results of the comparison in said second comparing means.

8. The system of claim 1, wherein said IC card device further includes:

third memory means for storing output data from said output means; and transmitting means for transmitting said output data stored in said third memory means into said external device, whereby the validity of the external device, the IC card device, and a card owner are confirmed.

9. The system of claim 1, wherein said input means of said IC card device is operable for inputting said second identification data when said IC card device is disconnected from said external device.

10. A method of operating an IC card system which includes an integrated circuit (IC) card device having at least a keyboard and a display, and an external device having at least an insertion portion to insert said IC card device for communication of said IC card device with said external device, the method comprising:

inserting said IC card device into said insertion portion of said external device;

transferring first identification data into said external device from said IC card device;

identifying said IC card device with said external device in accordance with said first identification data;

inputting second identification data into said IC card device by said keyboard while said IC card device is disconnected from said external device; and comparing said second identification data inputted by said keyboard with third identification data prestored in said IC card device.

11. The method of claim 19, further including:

displaying the result of said comparison step, to thereby indicate whether said external device, said IC card device and a card holder are authorized or not.

12. The method of claim 10, further including:

detecting the connection state of said IC card device and said external device when said IC card device is inserted in said insertion portion of said external device.

13. The method of claim 10, further including:

storing, in said IC card device, a signal corresponding to the result of said comparison step, said signal representing whether or not a card holder is authorized.

14. The method of claim 12, further including:

outputting said stored signal into said external device from said IC card device via a connection terminal.

15. The method of claim 14, further including:

judging, after said comparison step, in said external device whether said outputted signal represents a coincidence of said second identification data with said third identification.

16. The method of claim 15, further including:

displaying the result of said judgment of said judging step, thereby indicating whether or not a card holder is authorized.

17. The method of claim 10, wherein said step of inputting said second identification data into said IC card device is carried out when said IC card device is disconnected from said external device.

18. The method of claim 10, wherein said third identification data which is prestored in said IC card device is automatically read out during said comparing step.

* * * * *